US012582850B2

(12) United States Patent
Pye et al.

(10) Patent No.: US 12,582,850 B2
(45) Date of Patent: Mar. 24, 2026

(54) CABLE SLEEVE FOR FALL PROTECTION SYSTEM

(71) Applicant: 3M INNOVATIVE PROPERTIES COMPANY, St. Paul, MN (US)

(72) Inventors: Macaulay Pye, Christchurch (NZ); Jamie Wallace, Christchurch (NZ); Peter Scott, Christchurch (NZ); Ben Hughes, Christchurch (NZ); James P. Endle, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 444 days.

(21) Appl. No.: 18/283,036

(22) PCT Filed: Mar. 4, 2022

(86) PCT No.: PCT/IB2022/051955
§ 371 (c)(1),
(2) Date: Sep. 20, 2023

(87) PCT Pub. No.: WO2022/208187
PCT Pub. Date: Oct. 6, 2022

(65) Prior Publication Data
US 2024/0173577 A1     May 30, 2024

Related U.S. Application Data

(60) Provisional application No. 63/170,024, filed on Apr. 2, 2021.

(51) Int. Cl.
*A62B 1/14*          (2006.01)
*A62B 35/00*         (2006.01)
(Continued)

(52) U.S. Cl.
CPC ............ *A62B 1/14* (2013.01); *A62B 35/0081* (2013.01); *F16D 59/00* (2013.01); *F16D 63/006* (2013.01);
(Continued)

(58) Field of Classification Search
CPC ..... A62B 1/14; A62B 35/005; A62B 35/0081; A62B 35/04; E06C 7/186
See application file for complete search history.

(56) References Cited

U.S. PATENT DOCUMENTS 5,265,696 A     11/1993   Casebolt
5,862,903 A      1/1999   Gruden et al.
(Continued)

FOREIGN PATENT DOCUMENTS

WO     2019126135 A1     6/2019
WO     2020151715        7/2020
WO     2022036815        2/2022

OTHER PUBLICATIONS

"3M Lad-Saf Flexible Cable Safety Systems Installation", 3M DBI Sala Fall Protection Installation Instructions, 2020, pp. 1-288.
(Continued)

*Primary Examiner* — Kristen C Hayes
(74) *Attorney, Agent, or Firm* — Kenneth B. Wood

(57) ABSTRACT

A cable sleeve for use with a safety cable of a fall protection system. The cable sleeve has a braking system that includes a constant-contact wheel, a rotor that is connected to the constant-contact wheel, a cam plate, and a braking shoe. The rotor may have a permanent magnet and a magnetically susceptible item that is held in a disengaged position by the permanent magnet. Rotation of the constant-contact wheel can overcome the magnetic force and cause the item to move so as to engage with the cam plate and actuate braking by the braking shoe.

22 Claims, 9 Drawing Sheets

(51) Int. Cl.

| | | |
|---|---|---|
| *F16D 59/00* | (2006.01) | |
| *F16D 63/00* | (2006.01) | |
| *F16D 125/32* | (2012.01) | |
| *F16D 127/02* | (2012.01) | |

(52) U.S. Cl.

CPC ........ *A62B 35/005* (2013.01); *F16D 2125/32* (2013.01); *F16D 2127/02* (2013.01)

(56)  References Cited

U.S. PATENT DOCUMENTS

| | | |
|---|---|---|
| 8,959,664 B2 | 2/2015 | Johnson et al. |
| 9,132,297 B2 | 9/2015 | Casebolt et al. |
| 2020/0155874 A1 | 5/2020 | Allington et al. |
| 2020/0206550 A1 | 7/2020 | Blackford et al. |
| 2021/0060362 A1 | 3/2021 | Paglioli et al. |
| 2024/0167336 A1* | 5/2024 | Wallace ............... A62B 35/005 |
| 2025/0084700 A1* | 3/2025 | Rickmon ............. A62B 35/005 |
| 2025/0312630 A1* | 10/2025 | Brown ............... A62B 35/0081 |

OTHER PUBLICATIONS

International Search Report for PCT International Application No. PCT/IB2022/051955, mailed on May 24, 2022, 3 pages.

\* cited by examiner

CABLE SLEEVE FOR FALL PROTECTION SYSTEM

CROSS REFERENCE TO RELATED APPLICATIONS

This application is a national stage filing under 35 U.S.C. 371 of PCT/IB2022/051955, filed 4 Mar. 2022, which claims the benefit of U.S. Provisional Patent Application No. 63/170,024, filed 2 Apr. 2021, the disclosure of which is incorporated by reference in its/their entirety herein.

BACKGROUND

Fall protection systems are often used to enhance worker safety e.g. when climbing, descending, or otherwise using a climbing facility (e.g. a ladder) in the course of constructing or servicing telecommunication towers, water towers, distillation towers, smokestacks, wind turbines, oil rigs, cranes, or any elevated (or descending) structure.

SUMMARY

In broad summary, herein is disclosed a cable sleeve for use with a safety cable of a fall protection system. In one aspect, the cable sleeve comprises a braking system comprising a constant-contact wheel, a rotor that is connected to the constant-contact wheel, a cam plate, and a braking shoe. In another aspect, the rotor may comprise a permanent magnet and a magnetically susceptible item that is held in a disengaged position by the permanent magnet. Rotation of the constant-contact wheel and rotor can overcome the magnetic force and cause the item to move so as to engage with the cam plate and actuate braking by the braking shoe. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
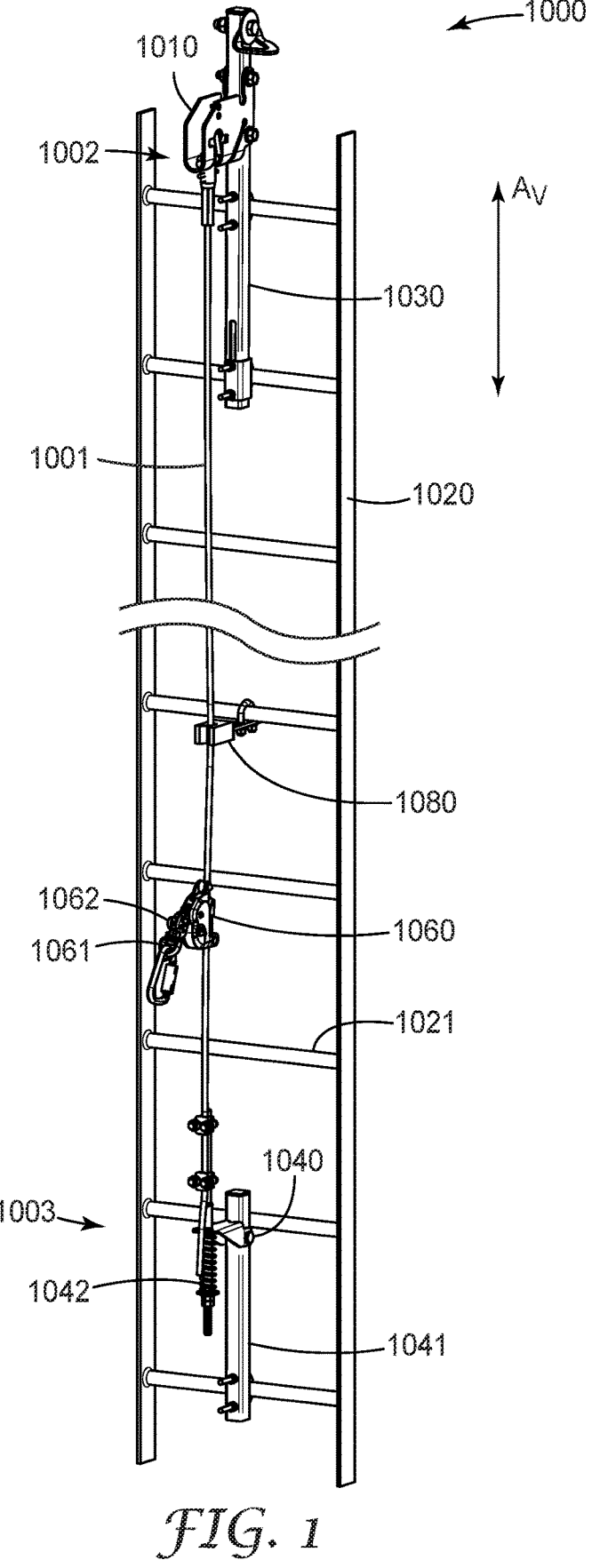
FIG. 1 is a perspective view of an exemplary ladder fitted with an exemplary fall protection system comprising a safety cable and a cable sleeve.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not necessarily to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as first and second may be used in this disclosure, it should be understood that those terms are used in their relative sense only unless otherwise noted. Terms such as vertical, and upward and downward directions along a vertical axis, will have their ordinary meaning with respect to the Earth. Terms such as forward and rearward are defined with respect to a cable sleeve and associated components. Rearward denotes a direction generally toward a harness to which the cable sleeve is connected; forward denotes an opposing direction generally away from the harness. (In ordinary use, the forward direction will typically be toward a ladder that a safety cable and cable sleeve are used in conjunction with). Transverse refers to directions (e.g. left and right directions) that are generally perpendicular to the forward-rearward axis of the cable sleeve. The vertical axis Av and upward and downward directions U and D thereof, the forward-rearward axis and forward and rearward directions F and R thereof, and the transverse axis, are indicated in various Figures for clarity. Terms such as rotatable, rotatably, pivotal, pivotally, pivotable, pivotably, and so on, are used interchangeably to refer to a configuration in which an item can rotate at least through an arc about an axis of rotation.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein is a cable sleeve for use in a fall protection safety system 1000. Such a fall protection safety system will often be a vertical fall protection safety system, provided e.g. to facilitate the use of a ladder 1020. As shown in exemplary embodiment in FIG. 1, such a safety system often comprises at least a top bracket 1010, a bottom bracket 1040, and a safety cable 1001. Often, top bracket 1010 is attached to a top rail 1030, which is attached to, or is a part of, a secure support (e.g. a permanently installed ladder). An upper end 1002 of safety cable 1001 is connected to top bracket 1010 with a lower end 1003 of safety cable 1001 being connected to a bottom bracket 1040, which may in turn be connected to a bottom rail 1041. The system may include a tensioning device 1042 (which may be conveniently located near bottom bracket 1040) which allows an appropriate tension to be applied to cable 1001. The system may also include one or more cable guides 1080 that stabilize safety cable 1001. Such cable guides can provide that cable 1001 is not, for example, buffeted by winds in such manner as would cause cable 1001 to contact ladder 1020 so as to cause wear or damage to cable 1001 or to ladder 1020, to cause undesirable noises, and so on. Fall protection systems of this general type are described in, for example, International Patent Application (PCT) Publication WO 2019/126135 and in the resulting U.S. patent application Ser. No. 15/733,190, both of which are incorporated by reference in their entirety herein.

Such a fall protection system 1000 may include a cable sleeve 1 (shown in generic representation in FIG. 1). Such a cable sleeve 1 (sometimes referred to as a rope grab) will comprise a connection 1061 that allows the sleeve to be connected to a harness worn by a person. Cable sleeve 1 is configured to travel along a safety cable 1001 e.g. as the person purposefully climbs upward or downward, and can be configured to lock up (or to travel downward at a slow, controlled speed) in the event of a worker fall, thus slowing and/or arresting the fall of the worker. In some embodiments a cable sleeve 1 may comprise a shock absorber 1062 (of any suitable design, e.g. a tear web, tear strip, or the like) that can act to reduce the forces encountered by the worker during a fall arrest. Cable sleeves are described in detail in, for example, U.S. Pat. No. 9,132,297.

Disclosed herein is a cable sleeve 1 that can be used with a safety cable 1001 of a fall protection system 1000. As shown in perspective view in FIGS. 2 and 3, cable sleeve 1 may comprise a chassis 10 comprising first and second major side plates 11 and 12. Major side plates 11 and 12 may be transversely spaced apart so as to define a central space 16 therebetween. At least one of the side plates (in the depicted case, side plate 12 as seen in FIG. 3) may comprise first and second wall portions 13 and 14, which are separated from each other to provide a through-slot 15 that allows a safety cable 1001 to be laterally inserted into central space 16 in order to install the cable sleeve 1 on the safety cable 1001.

Figure 2:
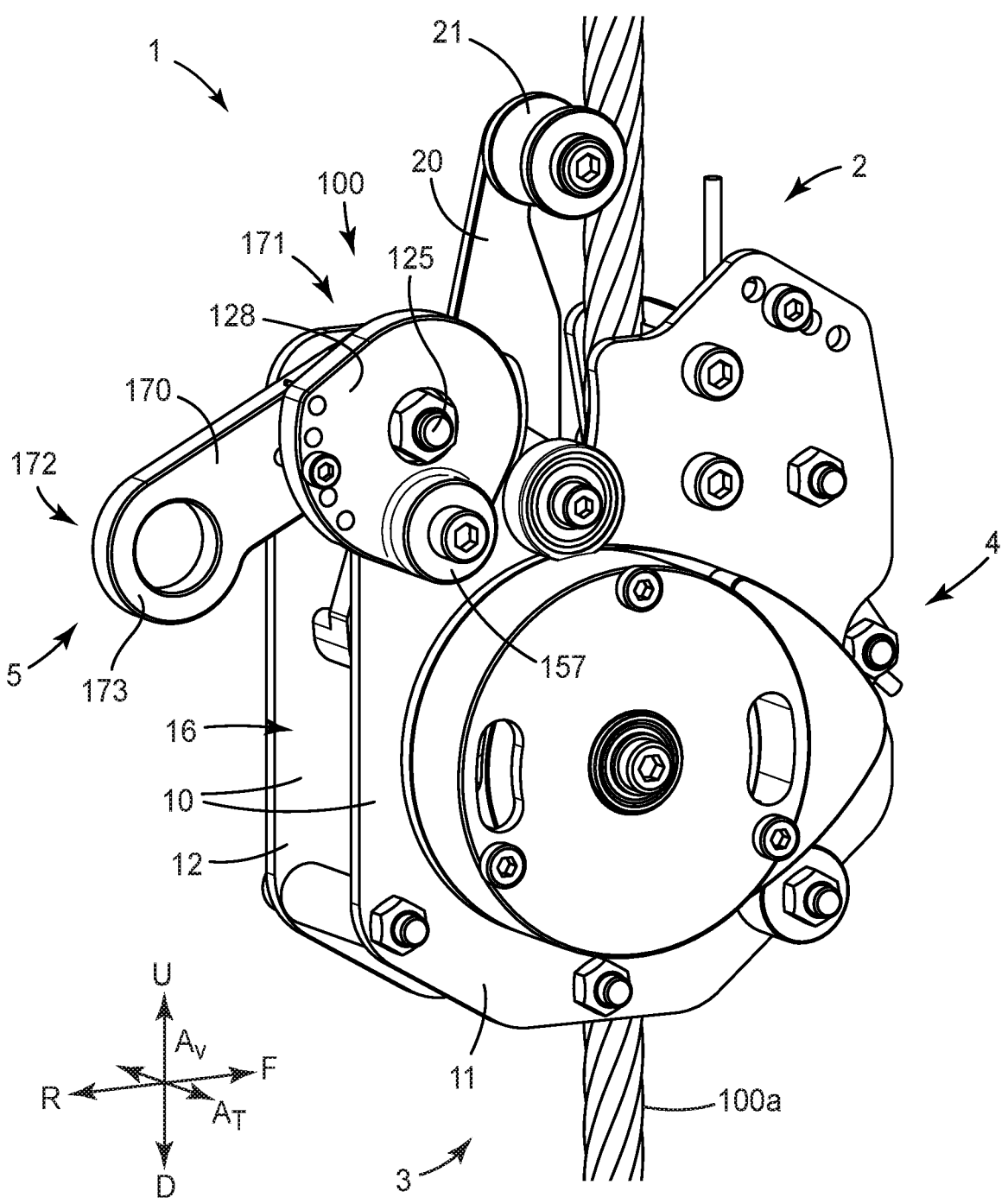
FIG. 2 is a side perspective view of an exemplary cable sleeve installed on a safety cable.

In ordinary use as installed on a safety cable 1001, cable sleeve 1 will typically comprise upper and lower ends 2 and 3 and a forward end 4 and a rearward end 5. Forward end 4 will typically be oriented toward a ladder with which the fall protection system 1000 is used; rearward end 5 will be oriented toward a harness worn by a user of the ladder and fall protection system. A connecting arm 170 will extend generally from rearward end 5 and will comprise a proximal end 171 (at which end arm 170 is attached to the chassis of the cable sleeve) and a distal end 172. Distal end 172 will comprise a connector 173 that enables arm 170, hence cable sleeve 1 as a whole, to be connected to a harness worn by a user. Arm 170, and connector 173 thereof, can provide the above-described connection 1061 and can have any suitable design. In some embodiments arm 170 may comprise a shock absorber 1062 as indicated in FIG. 1. In this regard it is noted that the exemplary cable sleeve 1 as shown in FIGS. 2-3 is a prototype that is configured for testing. As such, it comprises features (e.g. arm 170 does not comprise a shock absorber, connector 173 is a simple orifice, and so on) that differ from features that may be present in a commercial product.

Figure 3:
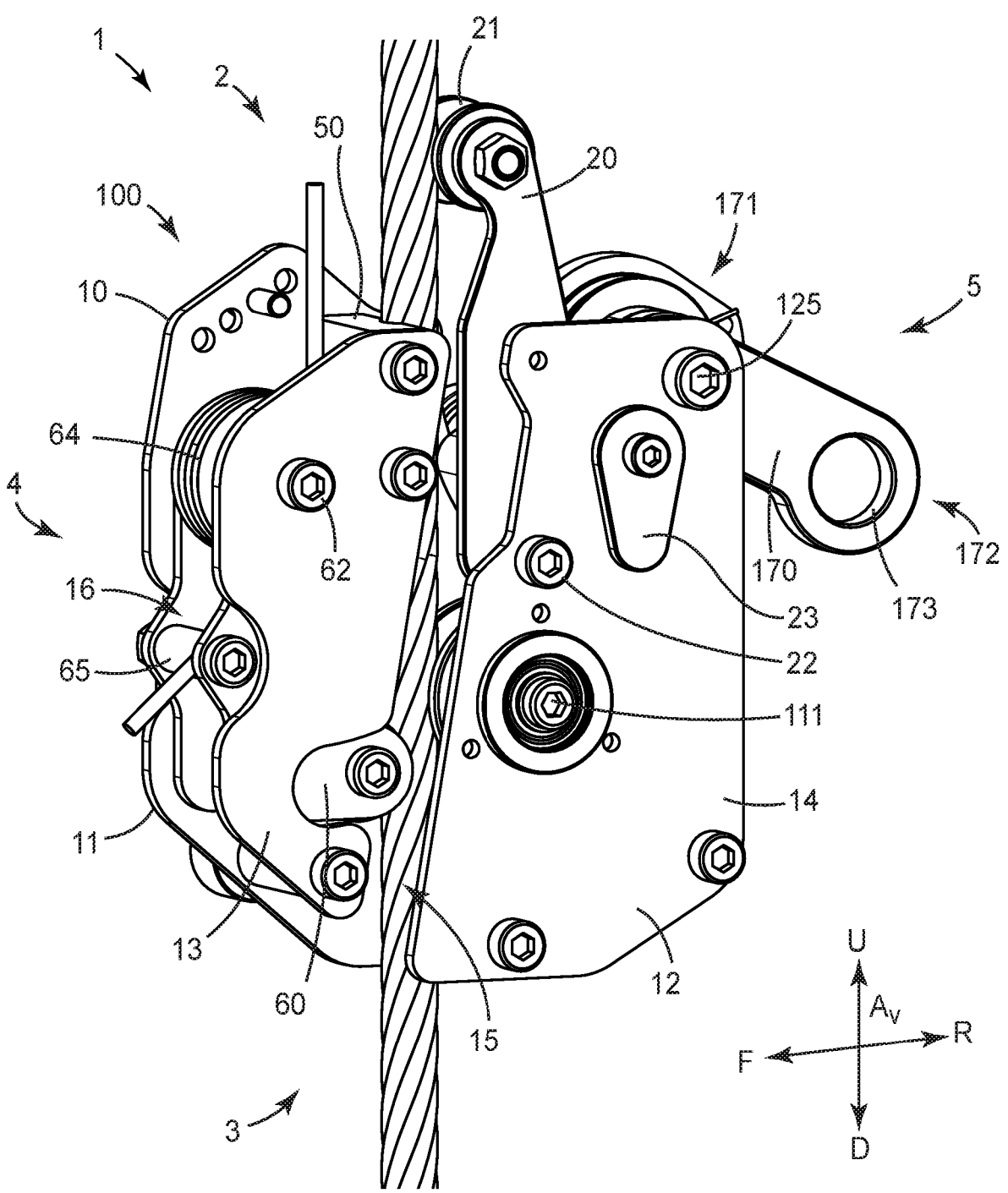
FIG. 3 is a side perspective view of the exemplary cable sleeve of FIG. 2, viewed from the opposite side.

Cable sleeve 1 as depicted e.g. in FIGS. 2 and 3 comprises various items and components that are arranged to facilitate the passage of safety cable 1001 through sleeve 1 as sleeve 1 moves along cable 1001. For example, sleeve 1 may comprise a runner 20 that extends generally upward from upper end 2 of chassis 10 and that may comprise a guide roller 21 at a terminal end thereof. In some embodiments, runner 20 may comprise a pivotal connection 22 to chassis 10 (as evident in FIG. 3) that allows runner 20 to be moved back and forth about pivotal connection 22. In particular, runner 20 may be pivotable to a retracted position that allows cable 1001 to be easily inserted into chassis 10 through cable-slot 15, after which runner 20 may be pivotally returned to a guiding position in which guide roller 21 is in operating contact with cable 1001 (as in FIGS. 2 and 3). In some embodiments, a lever 23 (visible in FIG. 3), operating e.g. via a camming mechanism (not visible in FIG. 3), may be used to facilitate the moving of runner 20 between the retracted position and the guiding position. In various embodiments, runner 20 may or may not be biased toward the guiding position; and/or runner 20 may be able to be fixed (locked) in the guiding position until released e.g. by the use of lever 23.

Figure 4:
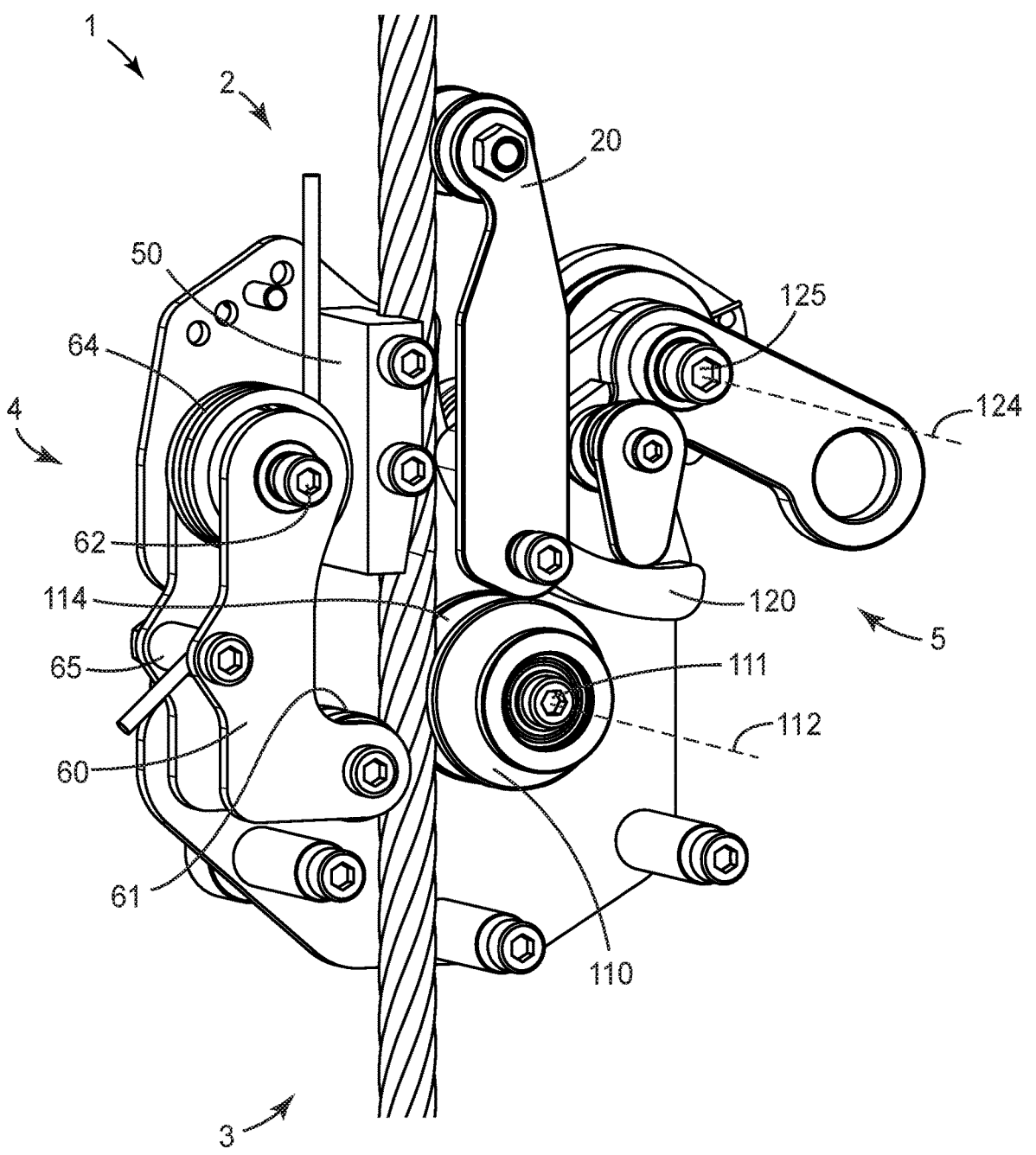
FIG. 4 is a side perspective view of the exemplary cable sleeve of FIG. 3, with a major side plate of the sleeve having been omitted.
Figure 5:
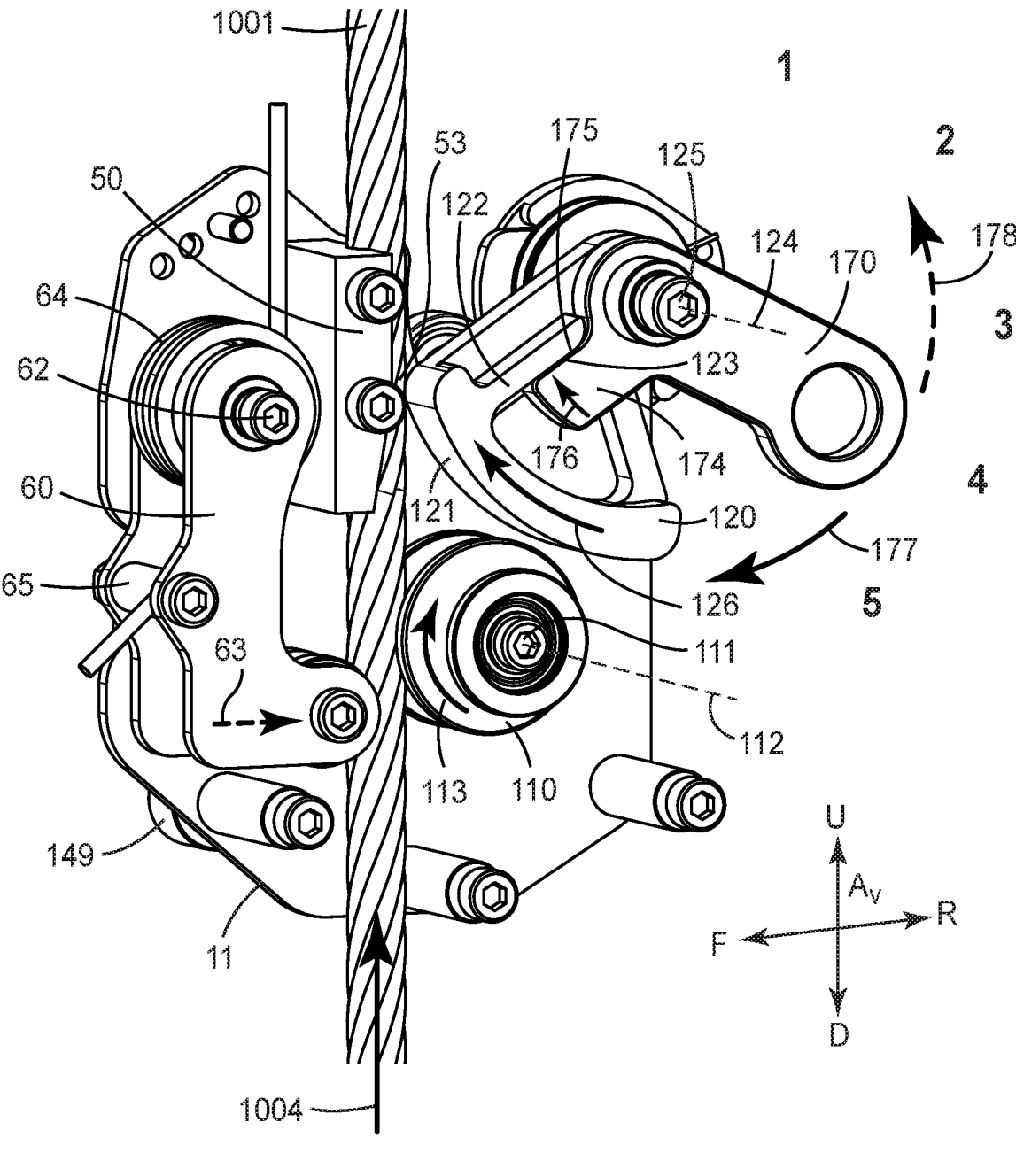
FIG. 5 is a side perspective view of the exemplary cable sleeve of FIG. 4, with additional components of the sleeve having been omitted.

Cable sleeve 1 comprises a braking system 100 (indicated in general in FIGS. 2 and 3) that relies on a braking shoe 120 as partly visible in FIG. 4 and most easily seen in FIG. 5. (FIGS. 4 and 5 are views from the same perspective as in FIG. 3; in FIG. 4, the nearest major side plate 12 has been removed; in FIG. 5, runner 20, lever 23, and associated items have been additionally removed so that braking shoe 120 can be more easily seen.)

Figure 8:
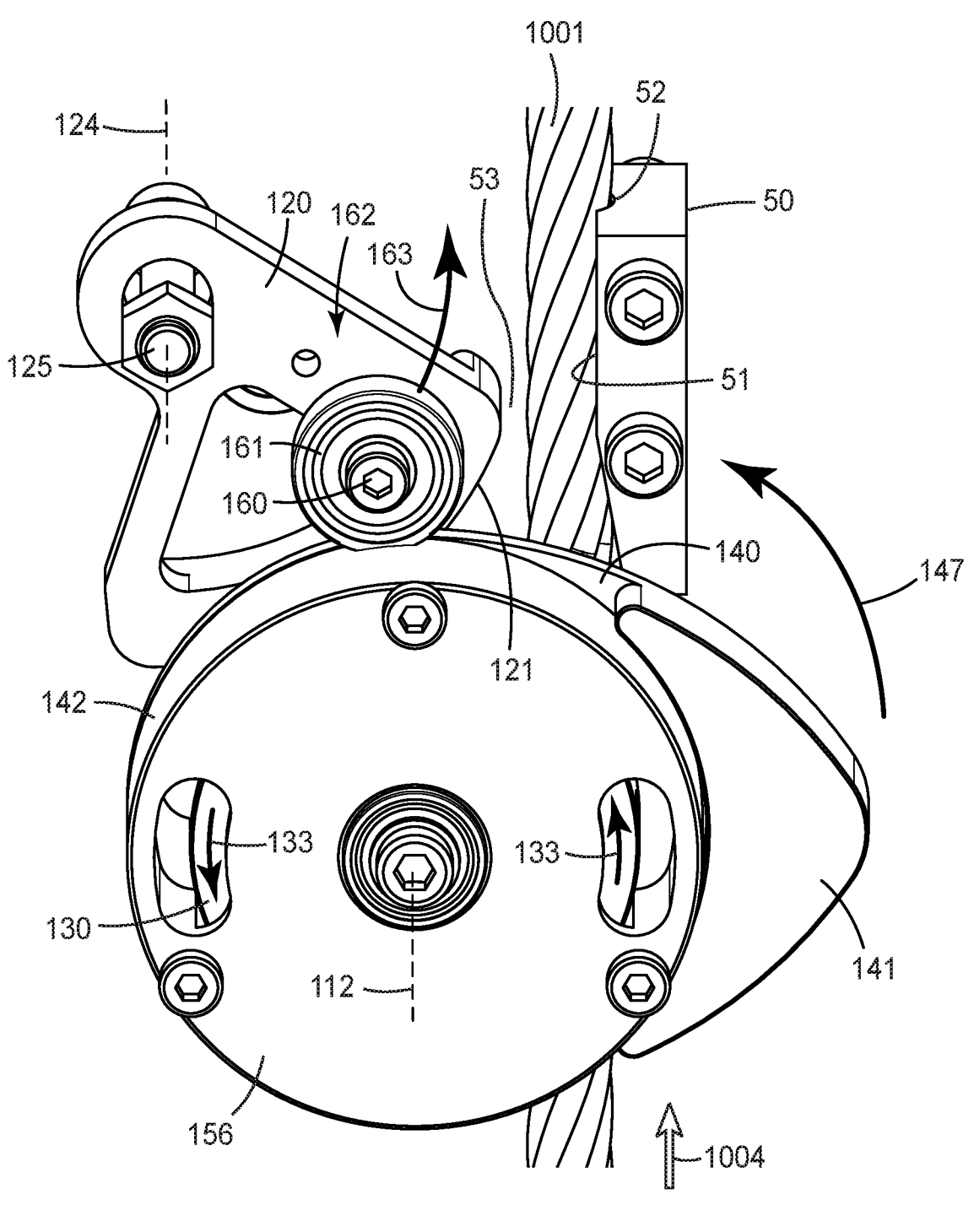
FIG. 8 is a side perspective view of the exemplary cable sleeve of FIG. 7, with various additional components of the sleeve having been omitted.

Braking shoe 120 is movably mounted on chassis 10. In the depicted embodiment this is done by mounting shoe 120 on a shaft 125 that extends between the first and second major side plates 11 and 12 so as to establish a pivotal connection that allows braking shoe 120 to be pivotable about an axis of rotation 124 as shown in FIG. 5. Braking shoe 120 comprises a braking surface 121 as indicated in FIG. 5. Braking shoe 120 is configured to work in combination with an anvil 50 that is fixed to chassis 10 and that comprises an anvil surface 51 (not visible in FIGS. 4 and 5, but pointed out in FIG. 8). Braking shoe 120 is configured so that in ordinary use of cable sleeve 1 (e.g. as a person purposefully ascends and descends with sleeve 1 moving along a safety cable 1001 in accordance with the person's movements) braking shoe will reside in a first position in which a first gap 53 is present between braking surface 121 of braking shoe 120 and anvil surface 51 of anvil 50. With braking shoe 120 in this first position (e.g. as in FIGS. 4 and 5), safety cable 1001 can slide freely through first gap 53 between braking surface 121 and anvil surface 51. (In some embodiments, anvil surface 51 may comprise a notch or groove 52 that is profiled to match the outer diameter of cable 1001; the upper end of such a groove 52 is indicated in FIG. 8.) While there may be some incidental contact of cable 1001 with one of these surfaces (e.g. cable 1001 may slide along anvil surface 51), any frictional forces applied by braking surface 121 and/or anvil surface 51 on cable 1001 will not be such that the motion of cable 1001 is unduly restricted.

Braking shoe 120 is movable from the first position to a second position in which braking surface 121 of shoe 120 is closer to anvil surface 51 of anvil 50 than it was when in the first position. In the depicted embodiment of FIG. 5, this motion will be pivotal motion about axis of rotation 124, as indicated by arcuate arrow 126. This motion will cause that a second gap is now present between braking surface 121 and anvil surface 51, the second gap being smaller than the first gap 53 so that motion of safety cable 1001 through the second gap is restricted by frictional forces imparted by braking surface 121 and anvil surface 51. In other words, the moving of braking shoe 120 to the second position will "pinch" cable 1001 between braking shoe 120 and anvil 50, thus slowing and/or halting the passage of cable 1001 through cable sleeve 1. In some embodiments, a pivotally-mounted braking shoe 120 may comprise a braking surface 121 that is an arcuate surface that is eccentrically disposed relative to the axis of rotation 124 of braking shoe 120, so that as the braking shoe pivotally moves from the first position to the second position, the braking surface 121 of the braking shoe 120 moves closer to the anvil surface 51 of anvil 50.

Figure 6:
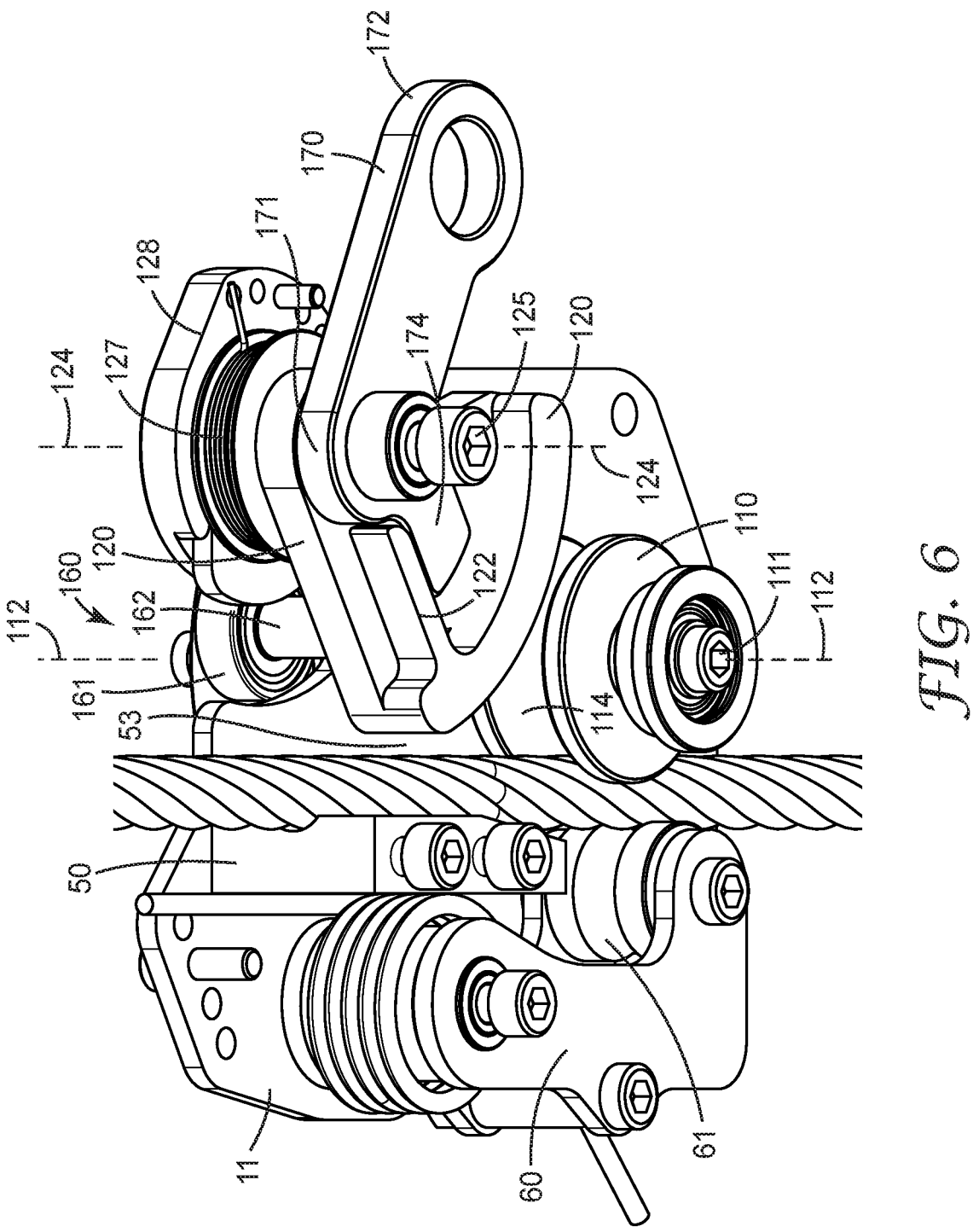
FIG. 6 is a top-side perspective view of the exemplary cable sleeve of FIG. 5.

Braking shoe 120 can be configured to be triggered to move from the first position to the second position in a number of ways as discussed in detail later herein. In some embodiments, braking shoe 120 may be biased toward the first position so that braking shoe 120 tends to remain in the first position unless triggered to move toward the second position. In some embodiments braking shoe 120 may be gravitationally-biased toward the first position. By this is meant that shoe 120 is configured to have a center of mass that, when cable sleeve 1 is in ordinary use (i.e., is aligned generally vertically as in FIGS. 2-5), the weight of shoe 120 will tend to urge it toward the first position. In some embodiments, shoe 120 may be biased by way of a biasing member. Such a biasing member (in the depicted case, a torsion spring 127, visible in the top view of FIG. 6) may augment any gravitational biasing, may oppose (e.g. partially offset) any gravitational biasing so that a desired overall biasing effect is achieved, or may be used instead of gravitational biasing. (It is noted in passing that item 128 as shown in FIG. 6 is an adjustable torsion plate that allows the torsion that is applied to spring 127 to be varied. This was included for testing purposes and may not necessarily be included in any commercial product.)

Whatever biasing system is used, alone or in combination, the biasing system will be configured so that the braking action of braking shoe 120 can be triggered by an appropriate stimulus. As discussed in detail later herein, multiple different methods of triggering can be used. It will be appreciated e.g. from examination of FIG. 5, that however braking shoe 120 is triggered, the subsequent braking action will be advantageously self-sustaining. That is, FIG. 5 reveals that once braking shoe 120 moves into a braking position as indicated by arrow 126, any further attempted motion of cable 1001 upward (as indicated by arrow 1004) will further accentuate the pinching action of braking shoe 120 to further retard the motion of cable 1001 through sleeve 1. In this regard it is noted that in actuality, a user fall will cause sleeve 1 to move downward relative to stationary cable 1001. However, the relative motion of cable 1001 and sleeve 1 is easily described with either of these items as a reference. Thus for convenience, many discussions herein will be phrased in terms of cable 1001 moving relative to sleeve 1 even thought it will be understood that in absolute terms it is sleeve 1 that will be in motion.

Cable sleeve 1 as disclosed herein comprises a braking system 100 that relies on a constant-contact wheel 110 as most easily seen in FIGS. 5 and 6. By a constant-contact wheel is meant a wheel (roller) 110 whose radially outer surface 114 is in constant contact with the outer surface of safety cable 1001 as cable 1001 moves upward or downward through sleeve 1. In particular this means that the rotation of wheel 110 (as indicated by arrow 113) is in lockstep with the linear motion of cable 1001 (as indicated by arrow 1004), with no slippage of cable 1001 relative to wheel 110.

In some embodiments, such a condition can be enhanced by using a pressor arm 60 comprising a pressor roller 61 as visible in FIG. 5, with pressor arm 60 being biased so as to exert a pressing force (indicated by dashed arrow 63 in FIG. 6) that causes pressor roller 61 to urge cable 1001 against constant-contact wheel 110. In some embodiments, pressor arm 60 may comprise a pivotal connection 62 to chassis 10 and may be biased by way of a torsion spring 64 to achieve such an arrangement. In some embodiments, pressor arm 60 may be configured so that it can momentarily be retracted (in a direction opposite dashed arrow 63) to allow arm 60 to be temporarily moved aside so that cable 1001 can be inserted through cable-slot 15 in the manner noted earlier herein. In some embodiments, this temporary retraction of pressor arm 60 may be achieved by manually (e.g. with a finger) pulling on shaft 65.

In some embodiments, the constant contact of wheel 110 with safety cable 1001 may be enhanced by biasing at least a radially outer contact surface 114 of constant-contact wheel toward safety cable 1001. This may be done either in addition to, or in place of, the above-described biasing of pressor arm 60. The biasing may take the form of e.g. biasing a shaft on which wheel 110 is mounted and/or providing wheel 110 with internal biasing that urges the radially outer contact surface 114 radially outward.

The above arrangements notwithstanding, in many embodiments a primary manner in which the desired constant-contact (no-slip) interaction between wheel 110 and cable 1001 can be achieved is by purposefully establishing a suitable coefficient of friction between the outer surface 114 of wheel 110, and the outer surface of cable 1001. It has been found that a friction coefficient of at least 0.4 may be desirable; in some embodiments, the friction coefficient may be e.g. at least 0.6 or 0.8. Such a friction coefficient may be a static coefficient of friction that is measured by pressing the safety cable and wheel together with a suitable constant force, with an appropriate amount of tension on the cable, and with the wheel rotation disabled. A stepper motor can then be used to pull the wheel relative to the cable (or vice versa) and the pulling force at which slippage occurs can be recorded e.g. by a load cell. It will be appreciated that such a coefficient of friction takes into account the profile of the specific wheel and cable that are used, rather than being a "generic" coefficient of friction e.g. for two flat plates made of the wheel material and the cable material.

It has been found that a suitably high coefficient of friction can allow the desired constant-contact functionality to be maintained under a variety of environmental and use conditions. However, it may not be advantageous to choose a material of wheel 110 that is too soft (even though it may exhibit a desirably high friction coefficient) if this unacceptably affects the durability of the material. It has been found that elastomeric materials (e.g. molded organic polymeric materials such as polyurethane) with a Shore A hardness of e.g. at least 65, 70, or 75, up to 100, 95, or 90, can provide an excellent compromise between the need for a high friction coefficient and the need for durability. In some embodiments, a wheel 110 (or, at least a radially outer surface layer thereof) may comprise a somewhat harder material, but with the harder material comprising parcels (whether in the form of granules, fibers, particles, etc.) of a softer material that enhances the frictional characteristics. As is evident from e.g. FIG. 6, the outer surface 114 of wheel 110 can be profiled so that it is complementary with the outer diameter of cable 1001, to enhance the frictional interaction between these items.

Constant-contact wheel 110 is rotatably mounted on chassis 10 so as to exhibit an axis of rotation 112 as indicated in FIGS. 4 and 5. Typically, any such axis of rotation will be oriented at least generally along the transverse axis of chassis 10 and of cable sleeve 1 as a whole. (The same will often be true of the other rollers, pivotable/rotatable items, etc., of cable sleeve 1.) In some embodiments the above arrangement may be achieved by mounting wheel 110 on a shaft 111 that is connected to chassis 10, e.g. to first and/or second major side plates 11 and 12 thereof. Wheel 110 may be rotatably mounted on shaft 111 and/or shaft 111 may be rotatably mounted on chassis 10, as long as the result is that wheel 110 is rotatable.

Figure 7:
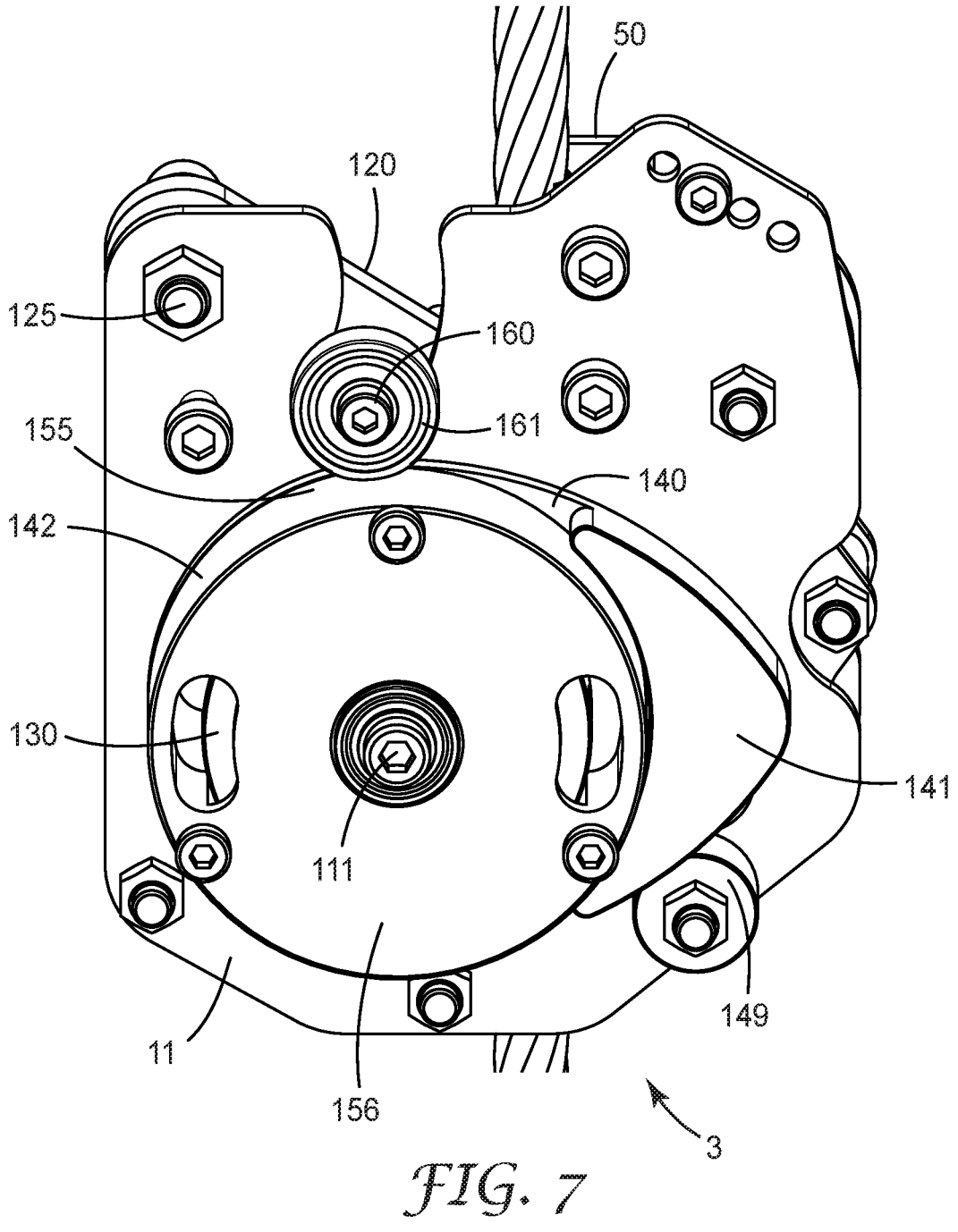
FIG. 7 is a side perspective view of the exemplary cable sleeve of FIG. 2, with various components of the sleeve having been omitted.

Braking system 100 also comprises a cam plate 140, most easily seen in the view of FIGS. 7 and 8 (noting that FIG. 8 is the same view as FIG. 7, but with major side plate 11 and associated items omitted so that the geometric and operative relationships between cam plate 140 and braking shoe 120 can be more easily seen). Cam plate 140 is rotatably mounted to chassis 10 (in the exemplary embodiment, cam plate 140 is rotatably mounted to major side plate 11 of chassis 10) so that cam plate 140 has an axis of rotation 112 that is coaxial with (i.e., is the same as) the axis of rotation 112 of the above-described constant-contact wheel 110. However, cam plate 140 is mounted to chassis 10, independently of wheel 110 (e.g. cam plate 140 is not fixedly mounted on the same shaft as constant-contact wheel 110) so that rotation of constant-contact wheel 110 does not cause cam plate 140 to rotate except under specific actuating conditions described later herein. Cam plate 140 comprises a circular collar 142 and further comprises a radially-outwardly-extending cam lobe 141.

In ordinary use of cable sleeve 1, cam plate 140 will typically be in a first, non-braking position generally as shown in FIGS. 7 and 8. Under certain conditions, cam plate 140 will rotate as generally indicated by arrow 147, toward a second, braking position as discussed below. In some embodiments, cam plate 140 may be biased toward the first, non-braking position so that cam plate 140 tends to remain in the non-braking position unless caused to move toward the second position. In some embodiments cam plate 140 may be gravitationally-biased toward the non-braking position. By this is meant that cam plate 140 is configured to have a center of mass that is located so that, when cable sleeve 1 is in ordinary use (i.e., aligned generally vertically as in FIGS. 7-8), the weight of cam plate 140 will tend to urge it toward the non-braking position. In a relatively straightforward approach, the weight of cam lobe 141 may be sufficient to accomplish this.

In some embodiments, cam plate 140 may be biased (e.g., toward the non-braking position) by way of a biasing member, e.g. a torsion spring. Such a biasing member may augment any gravitational biasing that is present, may oppose (e.g. partially offset) any such gravitational biasing (so that a desired overall biasing effect is achieved), or may be used instead of any gravitational biasing. In some embodiments, a stop 149 (visible in FIG. 7) may be provided to establish the non-braking position of cam plate 140.

Braking system 100 also comprises a cam follower 160 that is connected to braking shoe 120. In the depicted embodiment, cam follower 160 comprises a bollard 161 (e.g. in the form of a disc) that is rotatably mounted on a stem 162 (most easily seen in the top view of FIG. 6) that is connected to braking shoe 120. As cam plate 140 rotates about axis 112, cam lobe 141, which will initially be in a first, non-braking position as shown in FIGS. 7 and 8, will rotatably move along the general path indicated by arrow 147 of FIG. 8. During this initial portion of the rotation, bollard 161 may be out of contact with any portion of cam plate 140; or, bollard 161 may "ride along" the radially outer surface 155 of cam collar 142. Either way, bollard 161 will remain substantially in its initial position. However, bollard 161 is in the rotation path of cam lobe 141; therefore, if cam plate 140 rotates far enough (e.g. so that cam lobe 141 moves toward a 12 o'clock position in FIG. 8), lobe 141 will impinge on bollard 161 of cam follower 160 and will urge cam follower 160 to move in the general direction indicated by arrow 163 of FIG. 8. Cam follower 160 being connected to braking shoe 120 (by way of stem 162), this will cause braking shoe 120 to move in the general direction indicated in FIG. 8 by arrow 163 (which corresponds to the general direction described above with reference to arrow 126 of FIG. 5).

It is thus evident that the rotation of cam plate 140 from a non-braking position to a braking position will, by way of the action of cam lobe 141 on cam follower 160, urge braking shoe 120 from its first position to its second position, thus causing the previously-described braking in the form of "pinching" cable 1001 between braking shoe 120 and anvil 50.

The above discussions have not yet detailed how the rotation of cam plate 140 from a non-braking position to a braking position can be triggered. To this end, braking system 100 further comprises a rotor 130. Portions of rotor 130 are visible through windows (unnumbered) in the outer cover 156 of cam plate 140. Rotor 130 is more fully visible in FIG. 9, which is a cross-sectional view of rotor 130 and cam plate 140 and is discussed below in detail.

Unlike cam plate 140, which is rotatably mounted to chassis 10 so as to be independent of constant-contact wheel 110, rotor 130 is coaxially, and fixedly, connected to constant-contact wheel 110. By this is meant that rotor 130 shares the same axis of rotation 112 as wheel 110 and that rotor 130 rotates in lockstep with wheel 110. This may be accomplished, for example, by mounting rotor 130 on the same shaft 111 as wheel 110, with both rotor 130 and shaft 111 being fixed to shaft 111, e.g. by using a keyed mounting 139 of rotor 130 to shaft 111 as evident in FIG. 9. It is evident e.g. from FIGS. 8 and 9 that cam plate 140 will be coaxial with rotor 130 (and thus with constant-contact wheel 110) in the sense of sharing the same geometric axis of rotation 112; however, cam plate is not mounted on the same physical shaft (e.g. shaft 111) as rotor 130 and wheel 110 and is not in any sense fixed to rotor 130 or wheel 110. Rather, cam plate 140 is independent of rotor 130 and wheel 110.

With such an arrangement, upward motion of cable 1001 relative to cable sleeve 1 as indicated by arrows 1004 of FIGS. 5 and 8 will cause commensurate rotation of constant-contact wheel 110 as indicated by arrow 113 of FIG. 5. Since wheel 110 is fixedly connected to rotor 130, rotor 130 will necessarily rotate with wheel 110 as indicated by arrows 133 of FIG. 8. This motion as a user descends along cable 1001, and opposite motion as the user ascends along the cable, will occur during ordinary work activities by the user. Such motion will not activate the above-described braking action (that is, cam plate 140 and braking shoe 120 will remain in their first, non-braking positions), absent specific circumstances as described below.

Figure 9:
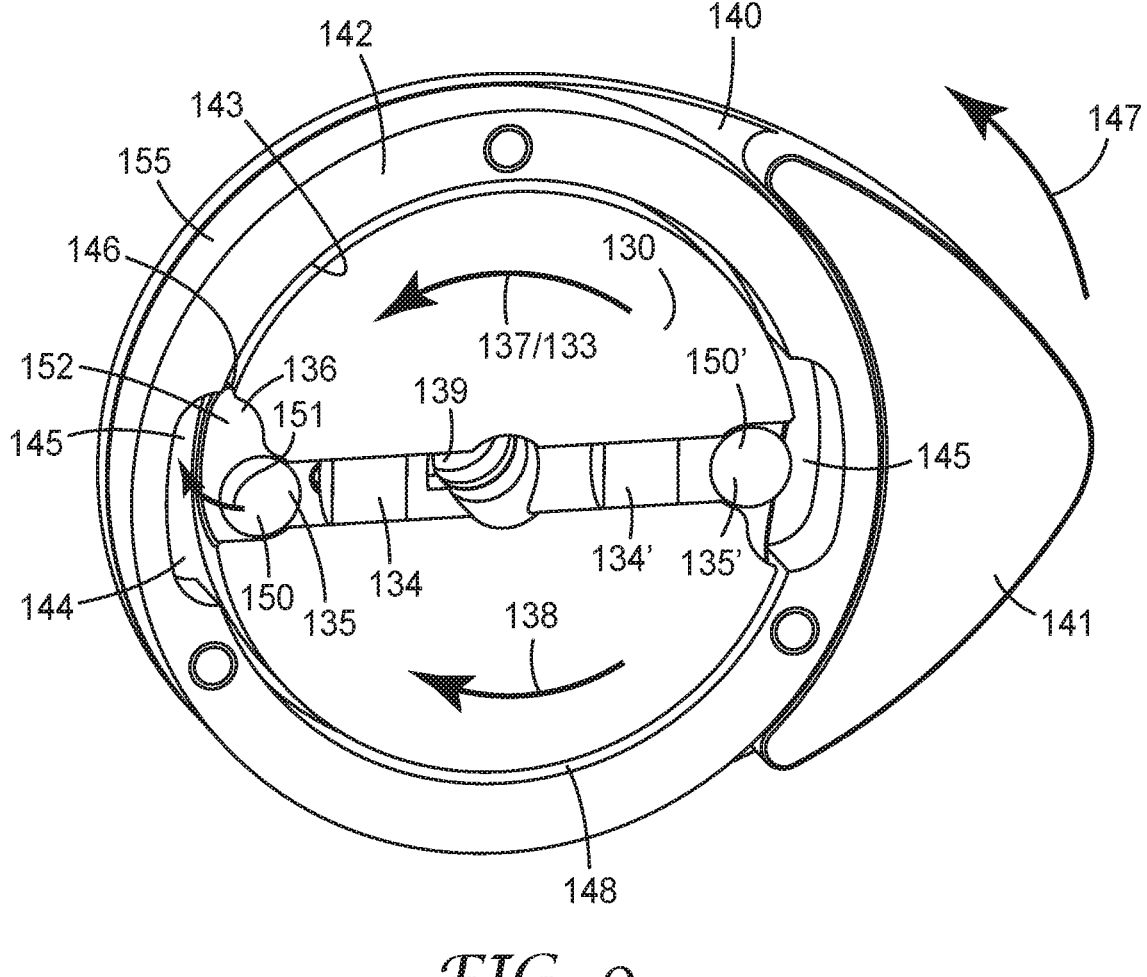
FIG. 9 is a side cross-sectional slice view of an exemplary cam plate and rotor of a cable sleeve.

In some embodiments, the rotation of rotor 130 in tandem with the rotation of constant-contact wheel 110 can cause an interaction with cam plate 140 that results in moving cam plate from a non-braking position to a braking position, by way of a magnetic/inertial mechanism. Such arrangements can be described with reference to FIG. 9, which is a cross-sectional slice view of an exemplary cam plate 140 and rotor 130. In some embodiments, rotor 130 may comprise at least one permanent magnet 134 that is fixedly attached to rotor 130. Also present may be at least one magnetically susceptible engaging item 150 that is movably disposed on rotor 130. (In FIG. 9, two such magnets 134 and 134', and two such engaging items 150 and 150', are present.) During ordinary use of sleeve 1, a magnetically susceptible engaging item 150 will reside in a disengaged position on rotor 130, e.g. held in a generally radially-outward-facing open-ended cavity 135 provided for this purpose. (Magnetically susceptible engaging items 150 and 150' in FIG. 9, are shown in such a disengaged position, respectively in cavities 135 and 135'.) The engaging item 150 will be held in this disengaged position by the magnetic attraction of a permanent magnet 134. Rotor 130 will rotate in tandem with constant-contact wheel 110. Collar 142 of cam plate 140 is concentrically disposed about rotor 130 with an air gap 148 therebetween (as evident in FIG. 9), so that during ordinary use of sleeve 1, collar 142 does not interfere with the rotation of rotor 130 and rotation of rotor 130 does not cause movement of collar 148. However, rotor 130, collar 142, and, in particular, magnet 134 and magnetically susceptible engaging item 150, are configured so that rotation of rotor 130 above a predetermined threshold rotational speed will overcome the magnetic attractive force of magnet 134 on item 150 and will urge item 150 to move at least generally radially outward from its disengaged position into an engaged position in which item 150 engages cam collar 142 of cam plate 140 thus forcing cam plate 140 to rotate from its non-braking position toward a braking position.

In other words, at a sufficiently high rate of rotation of rotor 130 e.g. in the direction indicated by arrow 133, the centrifugal force on engaging item 150 can exceed the magnetic force exerted on item 150 by magnet 134, so that item 150 will move generally radially outward as generally indicated by arrow 151 and will engage cam collar 142 with the result that continued rotation of rotor 130 in direction 133 will cause cam plate 140 to rotate as generally indicated by arrow 147. This will cause the above-described impinging of cam lobe 141 on cam follower 160 with consequent braking action.

Cam collar 142 can be configured to enhance the above-described functioning. For example, in some embodiments, the radially-inward-facing surface 143 of cam collar 142 may be continuous except where interrupted by one or more radially-outwardly-recessed slots 144 as seen in FIG. 9. Such an arrangement can provide that occasional momentary radially-outward movements of engaging item 150 (as caused e.g. by a quick motion of the user, the cable sleeve being bumped, etc.) will merely cause the outermost portions of engaging item 150 to momentarily contact inward surface 143 of collar 142, but will not cause item 150 to engage collar 142. Rather, item 150 may simply return to its disengaged position in cavity 135 of rotor 130.

However, a high, sustained centrifugal force on item 150 (such as in a fall) will continue to urge item 150 generally radially outward. At such time as rotor 130 rotates to bring item 150 into alignment with a slot 144 (as in FIG. 9), item 150 is able to move (as per arrow 151) generally radially outward into space 145 defined by slot 144. Item 150 will then jam against an end of the slot (e.g. with the center of item 150 at or near position 146) and will thus establish a physical interference such that cam plate 140 must necessarily rotate with rotor 130.

Discussions above have been couched in terms of engaging item 150 moving generally radially outward from its initial, disengaged position. Investigations herein have indicated that such functioning can be enhanced if the path that item 150 follows from its disengaged position to its engaged position is not strictly radially outward. (By a strictly radially outward path is meant the shortest linear path directly radially outward, e.g. a path that resembles a spoke of a wagon-wheel.) Rather, in some embodiments the path may include a significant circumferential aspect. Thus, as used herein, the terminology of a path that is generally radially outward is defined herein as one that has any measurable radial component; such a path may include a significant circumferential component as well.

This necessitates distinguishing the two possible rotation directions of rotor 130. FIG. 9, in combination with FIG. 8, makes it clear that the rotation direction denoted by arrow 133/137 in FIG. 9 is the rotation direction that corresponds to upward motion of cable 1001 relative to sleeve 1 (i.e. downward motion of sleeve 1 along cable 1001) and that thus may require braking. This direction 133/137 of rotation of rotor 130 will be termed the rotation direction, with opposing direction of rotation 138 (also shown on FIG. 9) being termed the antirotation direction.

As evident in FIG. 9, in some embodiments the path that engaging item 150 follows (as indicated in general by arrow 151) from its disengaged position to an engaged position, may include a significant circumferential component that is specifically in the antirotation direction. In some embodiments this may be achieved by having the above-mentioned generally radially-outward-facing open-ended cavity 135 in which item 150 resides when in its disengaged position, be connected to a generally radially-outward-facing open-ended channel 136 that extends from cavity 135 in a direction circumferentially along rotor 130 in the antirotation direction 138.

Such an arrangement provides that engaging item 150 can move towards its engaged position along a path that has a significant circumferential component in the antirotation direction. So, the movement of rotor 130 in the rotation direction (indicated by arrows 133/137) can cause item 150 to "lag behind" rotor 130 as rotor 130 turns. This can cause item 150 to move relative to rotor 130 along a path that, while being generally radially outward (defined herein as having any measurable radial component) will also have a significant circumferential component in the antirotation direction. In other words, item 150 may follow a somewhat spiral-segment path as generally indicated by arrow 151, until item 150 reaches an engaged position generally at location 152, at which point item 150 can move no further either radially outward, or circumferentially in the antirotation direction. It has been found that such arrangements can, in some circumstances, provide e.g. for smoother movement of engaging item 150 along its path and can thus provide for smoother engagement and braking.

Various parameters and attributes of the above-recited entities can be chosen to establish a predetermined threshold rotational velocity of rotor 130 at which engaging item 150 moves from its disengaged position to its engaged position. (This predetermined threshold rotational velocity of rotor 130 will correspond to a predetermined linear velocity of sleeve 1 relative to cable 1001 at which it is desired to activate braking.) In some embodiments, the entities described above may be arranged and configured so that the movement of engaging item 150 from its disengaged position toward its engaged position may be promoted to at least some extent by acceleration of rotor 130 (rather than being substantially, or essentially, promoted by the rotational velocity of rotor 130 alone, irrespective of any acceleration). Thus in some embodiments there may be a predetermined threshold acceleration at which acceleration-actuated braking occurs, and/or there may be a combination of both velocity and acceleration at which braking may be actuated by a combination of both mechanisms. (It will be evident that the acceleration of rotor 130 that is referred to is acceleration that results from a change in the rotational velocity along an rotational path, rather than the centripetal acceleration that is present due to merely following a rotational path at constant velocity. It will also be evident that any such acceleration of rotor 130 will correspond to acceleration of sleeve 1 along safety cable 1001.)

Such a system may be tailored for a wide variety of uses and circumstances. The parameters that may be varied to achieve these ends may include of course the strength, size, and/or shape of the permanent magnet 134. Such parameters may also include the size, shape, and magnetic susceptibility of the magnetically susceptible engaging item 150. In many embodiments it may be advantageous that item 150 be at least generally spherical in shape, as evident in FIG. 9 so that item 150 can most easily move along the path from its disengaged position to an engaged position. Other parameters, e.g. the density of item 150, and the distance between magnet 134 and item 150, may be chosen to advantage (of all such parameters, the relationship of the weight of item 150 to the magnetic attraction between magnet 134 and item 150, may be a particularly useful variable). Other parameters of interest may be the various geometric and spatial parameters of cavity 135 and channel 136; for example, the radial-vs.-circumferential slope of the radially-inward floor of channel 136. It is noted in passing that by cavity 135 and channel 136 being "open-ended" is meant that these spaces are open in the radially-outward direction. That is, they have no "roof", any such roof being provided by portions of cam collar 142. Clearly, channel 136 does have a terminal, closed end 146 in the circumferential, antirotation direction. (Of course, any or all of the parameters listed above may be varied in order to achieve a desired velocity-actuation behavior, irrespective of whether any acceleration-actuation may occur.)

In some embodiments, two (or more) such permanent magnets (134 and 134' in FIG. 9) and two (or more) magnetically susceptible engaging items (150 and 150' in FIG. 9) may be present, the items being located (when in their disengaged position) in respective cavities 135 and 135'. In some embodiments, all such pairs of magnets and engaging items may be generally, substantially, or essentially equivalent to each other. Such multiple magnets, multiple engaging items, etc., (as well as multiple slots 144 in cam collar 142) may be present e.g. for redundancy. In some embodiments, a second magnet, engaging item, cavity, channel, and so on, may be configured differently from a first magnet, engaging item, cavity, channel and so on. For example, one such set of items might serve as a primary actuation mechanism, with a second set of such items serving as a secondary actuation mechanism that is e.g. configured to actuate at a slightly higher velocity than the primary mechanism (e.g. as a backup arrangement in case the primary mechanism does not actuate for some reason).

Any result-effective variable may be manipulated in such manner. In brief, this may be accomplished (in the example of a system involving two sets of magnets and engaging items) by way of the first and second magnets differing from each other, the first and second engaging items differing from each other, the first and second open-ended cavities differing from each other, and/or the first and second open-ended channels differing from each other, in any measurable aspect. (It is emphasized that this list is non-limiting and that other factors may similarly be manipulated.) For example, close inspection of FIG. 9 reveals that there may be slight differences in the certain items with and without primes (for example, the distance between the magnet and the engaging item, and the particular contours of cavity 135 versus cavity 135').

In some embodiments, any two (or more) such sets of items, whether identical or differing, may be circumferentially spaced away from each other, e.g. by an angular arc of at least 30, 45, 90, 135, or 170 degrees (measured from a circumferential centerpoint of each item). By way of a specific example, the various first and second items (e.g. cavity 135 and cavity 135') as shown in FIG. 9 are circumferentially spaced from each other by an angular arc of approximately 180 degrees.

The at least one permanent magnet 134 may be made of any permanent magnetic material that, in the chosen configuration, provides a suitable attractive force. (Such a magnet is by definition not an electromagnet.) In some embodiments, such a magnet may be made of a ceramic (ferrite) composite, comprising e.g. powdered iron oxide and barium/strontium carbonate. In some embodiments, such a magnet may be made of an alloy such as the so-called Alnico (iron-aluminum-nickel-cobalt) materials. In some embodiments, such a magnet may be made of an Al—Mn alloy. In some embodiments, such a magnet may be a rare-earth magnet of any suitable composition. In some specific embodiments, such a magnet may comprise neodymium (e.g., grade N52). Any such magnet may be coated (e.g. with nickel, copper, or zinc, and/or with an organic polymeric layer) e.g. in order to protect the magnetic material from abrasion, corrosion, and so on.

Such a magnet can be obtained in any suitable size and shape, e.g. as a bar, block, cube, disk, cylinder, ring, arc, or sphere. In some instances a generally-cylindrical magnet that is disc, button or drum-shaped may be used. The strength of any such magnet may be characterized by its attractive (pull) force. Pull forces of various magnetic materials, of various sizes and shapes, are available e.g. from KJ Magnetics, Pipersville, PA. In various embodiments, a permanent magnet as used herein may exhibit a pull force of at least about 0.05, 0.10, 0.20, 0.40, or 1.0 pounds (lbf). Such a magnet may be magnetized along any desired direction. For example, a cylindrical or button magnet may be axially magnetized or diametrically magnetized; a bar magnet may be magnetized along any desired axis, and so on, as long as the magnet is oriented to achieve the desired attractive force.

A magnet 134 may be mounted to rotor 130 (e.g. inserted and held in a dedicated receptacle of rotor 130) in any desired manner. In some embodiments, an adhesive or potting material (e.g. a photocurable adhesive, a thermally curable adhesive, a moisture-curable adhesive, and so on) may be used to bond the magnet to the rotor.

Magnetically susceptible engaging item 150 may be made of, or include, any suitable magnetically susceptible material that imparts item with the desired responsiveness to permanent magnet 134, and that also exhibits the requisite density so that the desired balance of magnetic forces to inertial forces can be obtained. Item 150 must of course also exhibit sufficient mechanical integrity and strength to survive the mechanical stresses that develop when item 150 engages collar 142 as described above.

In some embodiments, item 150 may be made of e.g. iron or steel (for example a low-carbon steel e.g. in the SAE 1006-1018 range, or a ferritic stainless steel, e.g. 430 grade stainless steel). In some particularly convenient embodiments, item 150 may be a spherical item made of a suitable high-carbon chromium steel (as is often used for ball bearings and the like). In some embodiments, item 150 may be made of some other material (e.g. a molded organic polymeric material) that is loaded as desired with a magnetically susceptible filler or additive (e.g. a ferromagnetic metal powder). By magnetically susceptible is meant that item 150 exhibits a magnetic susceptibility (volume susceptibility, in SI units) of at least 100. In various embodiments, item 150 may exhibit a magnetic susceptibility of at least 500, 1000, 10000, 100000, or 200000 (noting that the magnetic susceptibility of iron is typically considered to be in the range of 200000). In many embodiments, item 150 may be, or may comprise (e.g. as a filler, as noted above) a ferromagnetic material. In various embodiments, item 150 may exhibit an overall density of at least 6, 7, 8 or 9 grams per cubic centimeter.

Item 150 may have any suitable shape or size. As noted, in some embodiments it may be convenient for item 150 to be at least generally spherical so that item 150 can more easily move (whether by rolling, sliding, or some combination) from its disengaged position to its engaged position. As noted, item 150 is movably disposed on rotor 130. By this is meant that item 150 is not attached to rotor 130 and that the entirety of item 150 is movable relative to rotor 130. Such a requirement excludes items such as e.g. pawls that are pivotally attached to a rotor.

In some embodiments, cable sleeve 1 may be configured to exhibit braking that is actuated by acceleration of sleeve 1 along safety cable 1001, in an entirely different way than by the use of rotor 130. One such way in which this can be achieved is by configuring braking shoe 120 itself to provide acceleration-actuated braking. (This may occur in concert with, or in the absence of, any acceleration-actuated braking that is provided by rotor 130.) In some embodiments, such an arrangement of braking shoe 120 may be an extension of the gravitational biasing of braking shoe 120 that was mentioned earlier herein. A gravitationally-biased braking shoe 120 will have a center of mass located so that, when cable sleeve 1 is in ordinary use (i.e., is aligned generally vertically as in FIGS. 2-5), the weight of shoe 120 will tend to urge it toward the first position. Beyond this, shoe 120 may be configured so that (again when cable sleeve 1 is aligned generally vertically as in ordinary use) the center of mass of shoe 120 will be offset from the axis of rotation 124 of shoe 120. By this is meant that the center of mass of shoe 120 will not lie on a vertical line that is extended downward from axis of rotation 124 of shoe 120. Rather, the center of mass of shoe 120 will be spaced away (typically, in a direction along the forward-rearward axis of sleeve 1) from this vertical line. This will have the result that a downward acceleration of sleeve 1 will cause an upward force on shoe 120, causing a torque that urges shoe 120 to rotate upward about axis of rotation 124 in the general manner indicated by arrow 126 of FIG. 5. A braking shoe arranged in this manner, i.e. with a center of mass that is offset from the axis of rotation of the shoe, will be termed an acceleration-actuatable braking shoe.

From the discussions above, further aspects of the exemplary design of braking shoe 120 as shown e.g. in FIG. 5 can be appreciated. In this design, braking shoe 120 comprises a rather bulky main portion (the portion upon which arrow 126 is superimposed) that bears braking surface 121. This may be helpful not merely for mechanical strength (although this will of course be important) but also to ensure that the center of mass of shoe 120 is appropriately located far enough away from axis of rotation 124. It will also be appreciated that cable sleeve 1 may comprise one or more stops (in the form of any suitable physical entity, e.g. a boss, post, abutment, and so on) that prevent brake shoe 120 from rotating so far (counterclockwise, in the view of FIG. 5) that the center of mass of the shoe ends up vertically aligned with the axis of rotation of the shoe. Rather, in ordinary use of sleeve 1, the center of mass of braking shoe 120 will always remain offset from axis of rotation 124 in the manner discussed above. In some embodiments, braking shoe 120 may be biased (e.g. by a torsion spring or the like) in the general manner mentioned earlier herein. If such biasing is present, it may be configured to "balance" shoe 120 so that shoe 120 exhibits the desired response to acceleration; in various embodiments, such biasing may e.g. slightly assist, or slightly oppose, the force of gravity.

In summary, in some embodiments a cable sleeve 1 as disclosed herein may comprise a braking shoe 120 that is acceleration-actuatable, in addition to comprising a velocity-actuatable braking system (which itself causes braking by way of braking shoe 120) based on a rotor, cam plate, magnetically-susceptible engaging item, and so on, in the manner described above. Thus in such embodiments, cable sleeve 1 may be configured so that braking can be initiated by way of the velocity of the cable sleeve, and/or by the acceleration of the cable sleeve. In some embodiments, the predetermined threshold of each of these at which braking is initiated, may be set largely independently of each other.

As noted, cable sleeve 1 will comprise a connecting arm 170 that will extend generally from the rearward end 5 of cable sleeve 1 and will comprise a proximal end 171 (at which end the arm is attached to the chassis of the cable sleeve) and a distal end 172. Distal end 172 will comprise a connector 173 that enables arm 170, hence cable sleeve 1 as a whole, to be connected to a harness worn by a user. In some embodiments, connecting arm 170 can provide an additional mode of initiating braking, separate from the previously-described velocity-initiated braking as established by rotor 130, and separate from the above-described acceleration-initiated braking as established by braking shoe 120 itself, if such a functionality is present.

In such embodiments, proximal end 171 of arm 170 can be rotatably coupled to chassis 10, with this rotatable coupling comprising an axis of rotation 124 of arm 170 that is the same axis of rotation 124 as that of braking shoe 120. In other words, the axis of rotation of arm 170 is coaxial with the axis of rotation of braking shoe 120. Such an arrangement (as visible in FIGS. 4, 5 and 6) can be achieved e.g. by mounting arm 170 and braking shoe 120 on the same shaft 125 as in FIGS. 4-6.

Connecting arm 170 can be further configured to comprise a spar 174 that extends generally radially outward from the proximal end 171 of arm 170, as most easily seen in FIGS. 5 and 6. Rotation of arm 170 about axis 124 will thus cause commensurate rotation of spar 174. Spar 174 will operate in conjunction with a buttress 122 of braking shoe 120, buttress 122 being positioned in the rotation path of spar 174. As depicted in FIG. 5, in some circumstances arm 170 can be in a first positional range (spanning roughly the 1 o'clock position to the 3 o'clock position in FIG. 5) in which spar 174 of arm 170 does not contact buttress 122 of braking shoe 120. Thus, rotational motion of arm 170 within this range does not have any affect on braking shoe 120. However, if arm 170 is rotated into a second positional range (starting roughly at the 4 o'clock position as shown in FIG. 5; that is, the position of arm 170 in FIG. 5, and continuing clockwise) a contact surface 175 of spar 174 will impinge on a contact surface 123 of buttress 122. The result will be that continued motion of arm 170 in the direction indicated by arrow 177 will cause motion of spar 174 in the direction indicated by arrow 176 which will cause braking shoe 120 to move in the direction indicated by arrow 126 (all of these arrows are found in FIG. 5), e.g. to a second (braking) position as described earlier herein.

Such an arrangement can provide a method of actuating braking by way of movement of arm 170, that is independent of the above-described braking that is actuated by the rotation of rotor 130 (and is independent of any acceleration-actuated braking derived from braking shoe 120 itself). To summarize with reference to FIG. 6, such arm-actuated braking can be facilitated by way of braking shoe 120 having a buttress 122 upon which spar 174 of arm 170 can impinge; the rotor-actuated braking can be facilitated by way of braking shoe 120 having a cam follower 160 upon which cam lobe 141 can impinge upon the engaging of rotor 130 with cam plate 140.

In ordinary use of cable sleeve 1 (e.g. when a user is deliberately ascending or descending a ladder), cable sleeve 1 will ride along the safety cable 1001, typically at a position slightly below the connection point of the cable sleeve to the user's harness, due to the weight of cable sleeve. This will cause connecting arm 170 to be pulled upward (e.g. generally as indicated by dashed arrow 178 in FIG. 5) so that arm 170 will typically be in the 1 to 3 o'clock positional range, in which braking shoe 120 is not actuated. In the event of a user fall, the downward motion of the user (relative to the sleeve) may move arm 170 downward as generally indicated by arrow 177. Arm 170 will thus enter the above-described second positional range in which the motion of arm 170 in the direction indicated by arrow 177 will cause braking shoe 120 to be actuated to perform braking. It will be appreciated that such functioning can be facilitated by configuring the various components so that in ordinary use of the cable sleeve, the second positional range of the connecting arm is located generally vertically lower than the first positional range of the connecting arm.

The above disclosures make it clear that in some embodiments, a cable sleeve 1 may be configured so that braking can be initiated by velocity of the cable sleeve (relying on a rotor, cam plate, magnetically-susceptible engaging item, and so on, as described earlier herein); by acceleration of the cable sleeve (relying on an acceleration-actuatable braking shoe as described earlier herein); and/or by the mechanical action of connecting arm 170 as described immediately above.

In some embodiments, an arm-actuated braking arrangement can be used in combination with the above-described rotor-actuated braking arrangement. In a particular exemplary arrangement of this type, rotor-actuated braking can be used to trigger or initiate the arm-actuated braking. In such an arrangement, connecting arm 170 and braking shoe 120 can be configured so that continued motion of arm 170 within its second positional range in a direction away from its first positional range (e.g. in a clockwise direction toward and past the 5 o'clock position shown in FIG. 5) can cause braking shoe 120 to move past the braking shoe's above-described second position.

Specifically, the action of arm 170 can move braking shoe 120 into a third position in which the braking surface 121 of braking shoe 120 is closer to the anvil surface 51 of anvil 50 than it is when braking shoe 120 is in its second position. In other words, the action of arm 170 can move braking shoe 120 into a third position in which a third gap between braking surface 121 and anvil surface 51 is present, the third gap being smaller than the previously-described second gap between braking surface 121 and anvil surface 51.

To restate this, in some embodiments cable sleeve 1 can be configured so that the action of arm 170 can cause greater movement of braking shoe 120 (that is, braking shoe 120 can be moved toward anvil 50 to provide a gap that is smaller, and that thus provides a stronger pinching action on cable 1001) than can be caused by the action of rotor 130 and cam plate 140. In some embodiments, this restricted ability of rotor 130 and cam plate 140 to motivate braking shoe 120 through as wide a range of motion as can be achieved by actuation of arm 170, may be established e.g. by providing an upper cam stop 157 (visible in FIG. 2) against which cam lobe 141 may impinge and thus limit the rotational range of motion of cam plate 140.

Such an arrangement can provide advantages that are not necessarily immediately obvious. For example, in some embodiments, such an arrangement can allow rotor-actuated braking to act as a triggering mechanism to initiate arm-actuated braking. For example, in the event of a fall, the rotor-actuated braking may serve to slow the downward motion of the cable sleeve (relative to the downward motion of the user) to an extent that will cause the weight of the user to fully pull down on arm 170 thus actuating the full scope of the arm-actuated braking. Thus in some embodiments, the rotor-actuated braking may only need to serve as a trigger for the arm-actuated braking rather than to perform a full arrest of the falling person. In such embodiments, the rotor-actuated braking system may not necessarily need to be configured to withstand the forces that occur upon complete arresting of a user fall. In embodiments of this general type, in which the rotor-actuated braking is used primarily or only as a triggering mechanism for arm-actuated braking, it might be possible for some components of the rotor-actuated braking system to be advantageously lightweight. However, it is emphasized that in many embodiments the rotor-actuated braking system may be configured to withstand the forces that occur upon full-scale fall arrest (indeed, in some embodiments no arm-actuated braking may be present, with the rotor-actuated braking being the only braking mechanism); in such embodiments, all relevant components of the rotor-actuated braking system should be appropriately configured, e.g. made of steel or similarly mechanically durable materials.

Other components of cable sleeve 1 have not been specifically commented upon herein. However, ordinary artisans will readily understand that such components may be used and may be configured as needed to ensure proper functioning of cable sleeve 1. Such components may include various members, struts and the like, e.g. that serve to connect first and second side plates together to form chassis 10 (many such items are visible, unnumbered, in various Figures). Such components may also include bearings, bushings, and so on, that allow constant-contact wheel 110, braking shoe 120, and/or connecting arm 170 to be rotatably mounted onto chassis 10 (whether such an item is directly mounted onto a major side plate of chassis 10 or is mounted on a shaft that is connected to a side plate and/or extends between both side plates).

A safety cable 1001 with which a cable sleeve 1 is used may be of any suitable type and may be made of any suitable material, e.g. galvanized steel or stainless steel. In some embodiments, the safety cable might be made of an organic polymeric material. In various embodiments, any such cable may be e.g. ⅜ inch or 5/16 inch diameter, and/or it may be of a 1×7 or 7×19 strand construction. As noted, the frictional properties of the radially-outward surface of the safety cable should be taken into account to ensure that the frictional interaction between cable 1001 and the outer surface 114 of constant-contact wheel 110 is sufficient to provide the desired functioning. A cable sleeve 1 may be used with any suitable harness; various harnesses are depicted e.g. in U.S. Pat. No. 8,959,664, which is incorporated by reference in its entirety.

The herein-disclosed arrangements can be used in any situation in which fall protection during generally vertical climbing (and/or descending) is desired. This is not limited to situations involving ladders of the general type shown in FIG. 1. For example, a cable sleeve 1 may be used with a fall protection system that is installed on a so-called monopole as shown in exemplary embodiment in FIG. 9 of International Patent Application (PCT) Publication WO 2019/126135 and in the resulting U.S. patent application Ser. No. 15/733,190. Such a monopole may comprise a ladder collectively provided by outwardly-protruding rungs (posts) as depicted in the US' 190 application. It is thus emphasized that the term "ladder" broadly encompasses any arrangement of rungs, steps, outcroppings, recesses, platforms, footholds, handholds, etc., that is configured to allow vertical or generally vertical climbing and/or descending by a human. (In this context a ladder is not necessarily required to be movable from place to place and will often be fixed in place.) The "rungs" of any such ladder are not limited to the above-described types, but may include e.g. members or beams of a lattice (truss) tower, and so on. A ladder and/or the rungs thereof of such a safety system may be made of any suitable material, e.g. metal, wood, polymeric materials, and so on.

A fall protection safety system comprising a cable sleeve as disclosed herein may find use in any application in which fall protection while climbing, descending, or maintaining a particular height is desired. Although discussions herein have mainly concerned exemplary uses that involve climbing above an access point (e.g. climbing up from a ground-level access point), the arrangements disclosed herein may also find use in applications that involve descending below an access point (e.g., into a cargo hold or tank of a ship, into a mine shaft or air shaft, into a grain bin, and so on). As defined herein, a vertical safety system is one in which the elongate axis of a safety cable of the system is oriented within plus or minus 15 degrees of vertical. A vertical climbing fall protection safety system comprising a cable sleeve as disclosed herein may meet the requirements of any applicable standard. In various embodiments, such a safety system may meet the requirements of ANSI Z359.16-2016 (Safety Requirements for Climbing Ladder Fall Arrest Systems), as specified in 2016. In particular embodiments, such a safety system may meet the requirements of Section 4.2.1 (Dynamic Performance) and Section 4.2.2.4 (Static Strength) of this standard. In some embodiments, such a safety system may meet the requirements of OHSA rule 1926.1053, Section (a)(22)(i) (Dynamic Strength).

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter.

What is claimed is:

1. A cable sleeve for use with a safety cable of a fall protection system, the cable sleeve comprising a chassis and a braking system comprising:

a constant-contact wheel that is rotatably mounted on the chassis, a rotor that is fixedly and coaxially connected to the constant-contact wheel;

a cam plate that is rotatably mounted on the chassis so that the cam plate is independent of the rotor, the cam plate comprising a cam lobe and comprising a collar that is concentrically disposed about the rotor; and, a braking shoe that is movably mounted on the chassis and that is configured to reside in a first position in which a first gap is present between a braking surface of the braking shoe and an anvil surface of an anvil that is fixed to the chassis so that the safety cable can slide freely through the first gap between the braking surface and the anvil surface, and wherein the braking shoe is movable from the first position to a second position in which the braking surface is closer to the anvil surface than in the first position so that a second gap is present which is smaller than the first gap so that motion of the safety cable through the second gap is restricted by frictional forces imparted by the braking surface and the anvil surface, wherein the rotor comprises at least one permanent magnet that is fixedly attached thereto, and wherein the braking system further comprises at least one magnetically susceptible engaging item that is movably disposed in a disengaged position on the rotor and is held in the disengaged position by magnetic attraction of the permanent magnet, and, wherein the braking system is configured so that rotation of the constant-contact wheel above a predetermined threshold rotational velocity overcomes the magnetic attraction of the permanent magnet and urges the engaging item to move at least generally radially outward from the disengaged position into an engaged position in which the engaging item engages the collar of the cam plate causing the cam plate to rotate from a non-braking position to a braking position in which the cam lobe of the cam plate impinges on a cam follower that is connected to the braking shoe, causing the braking shoe to move from the first position to the second position.

2. The cable sleeve of claim 1 wherein the at least one magnetically susceptible engaging item is an at least generally spherical item that comprises a density of at least 7.0 g/cc, that is not fixed to the rotor, and that, when in its disengaged position, resides in a generally radially-outward-facing open-ended cavity of the rotor.

3. The cable sleeve of claim 2 wherein the engaged position of the at least one magnetically susceptible engaging item is circumferentially offset from the disengaged position, in an antirotation direction of the rotor.

4. The cable sleeve of claim 3 wherein the generally radially-outward-facing open-ended cavity of the rotor is connected to a generally radially-outward-facing open-ended channel that extends circumferentially along the rotor in the antirotation direction of the rotor, the channel defining a path along which the magnetically susceptible engaging item can move to reach the engaged position.

5. The cable sleeve of claim 4 wherein a radially-inward-facing surface of the collar of the cam plate comprises at least one radially-outwardly-recessed slot in which at least a radially-outward portion of the at least one magnetically susceptible item will reside when the item is in the engaged position.

6. The cable sleeve of claim 4 wherein the braking system comprises first and second magnetically susceptible engaging items that are movably disposed in first and second disengaged positions on the rotor in first and second generally radially-outward-facing open-ended cavities and are held in their respective disengaged positions by first and second permanent magnets; and, wherein the first generally radially-outward-facing open-ended cavity of the rotor is connected to a first generally radially-outward-facing open-ended channel that extends circumferentially along the rotor in the antirotation direction, which first channel defines a first path along which the first magnetically susceptible engaging item can move to reach its engaged position, and wherein the second generally radially-outward-facing open-ended cavity of the rotor is connected to a second generally radially-outward-facing open-ended channel that extends circumferentially along the rotor in the antirotation direction, which second channel defines a second path along which the second magnetically susceptible engaging item can move to reach its engaged position; and, wherein the second generally radially-outward-facing open-ended cavity and the second generally radially-outward-facing open-ended channel to which it is connected, are respectively circumferentially spaced away from the first generally radially-outward-facing open-ended cavity and the first generally radially-outward-facing open-ended channel to which it is connected, by an angular arc of at least 90 degrees.

7. The cable sleeve of claim 6 wherein:
the first and second permanent magnets differ from each other,
and/or the first and second magnetically susceptible engaging items differ from each other,
and/or the first and second generally radially-outward-facing open-ended cavities differ from each other,
and/or the first and second generally radially-outward-facing open-ended channels differ from each other,
so that movement of the second magnetically susceptible engaging item at least generally radially outward in response to rotational velocity of the rotor differs from movement of the first magnetically susceptible engaging item at least generally radially outward in response to rotational velocity of the rotor.

8. The cable sleeve of claim 1 wherein in ordinary use of the cable sleeve, the cam plate is gravitationally biased toward the non-braking position, in which position the cam lobe of the cam plate is not in contact with the cam follower.

9. The cable sleeve of claim 1 wherein the cam follower comprises a bollard that is in a rotation path of the cam lobe, the bollard being rotatably mounted on a stem that is connected to the braking shoe.

10. The cable sleeve of claim 1 wherein the braking shoe is pivotally mounted on the chassis so that the braking shoe is able to pivotally move about an axis of rotation from the first position to the second position, and wherein the braking surface of the braking shoe is an arcuate surface that is eccentrically disposed relative to the axis of rotation of the braking shoe so that as the braking shoe pivotally moves from the first position to the second position, the braking surface of the braking shoe moves closer to the anvil surface.

11. The cable sleeve of claim 10 wherein in ordinary use of the cable sleeve, the braking shoe is an acceleration-actuatable braking shoe that is gravitationally biased toward the first position.

12. The cable sleeve of claim 10 wherein the cable sleeve comprises a connecting arm, a proximal end of the connecting arm being rotatably coupled to the chassis and a distal end of the connecting arm comprising a connector that is configured to be connected, directly or indirectly, to a harness of a user of the cable sleeve.

13. The cable sleeve of claim 12 wherein the rotatable coupling of the connecting arm to the chassis defines an axis of rotation of the connecting arm that is coaxial with the axis of rotation of the braking shoe.

14. The cable sleeve of claim 13 wherein the connecting arm is rotatably movable about its axis of rotation, over a first positional range within which rotatable motion of the connecting arm does not cause the braking shoe to move; and, wherein the connecting arm is rotatably movable about this axis of rotation past the first positional range, into a second positional range within which rotatable motion of the connecting arm causes the braking shoe to move;

and wherein the connecting arm and the braking shoe are configured so that rotatable motion of the connecting arm within its second positional range, in direction away from its first positional range, causes the braking shoe to move from its first position toward its second position.

15. The cable sleeve of claim 14 wherein in ordinary use of the cable sleeve, the second positional range of the connecting arm is located generally vertically lower than the first positional range of the connecting arm.

16. The cable sleeve of claim 14 wherein the connecting arm comprises a spar that extends generally radially outward from the proximal end of the connecting arm, wherein the braking shoe comprises a buttress that is positioned in a rotation path of the spar of the connecting arm, and wherein the connecting arm and the braking shoe are configured so that rotatable motion of the connecting arm past its first positional range and into its second positional range causes the spar of the connecting arm to impinge on the buttress of the braking shoe to cause the braking shoe to move from its first position toward its second position.

17. The cable sleeve of claim 16 wherein the connecting arm and the braking shoe are configured so that continued motion of the connecting arm within its second positional range, in a direction away from its first positional range, causes the braking shoe to move past the braking shoe's second position in a direction away from the first position, into a third position of the braking shoe in which the braking surface of the braking shoe is closer to the anvil surface than it is when the braking shoe is in the second position, so that when the braking shoe is in its third position a third gap between the braking surface and the anvil surface is present, which third gap is smaller than the second gap between the braking surface and the anvil surface.

18. The cable sleeve of claim 1 wherein the chassis comprises first and second major side plates that are transversely spaced apart so as to define a central space therebetween, the chassis exhibiting a vertical axis and an upper and a lower end and a forward end and a rearward end, and wherein one of the first and second major side plates comprises a cable-insertion through-slot that extends generally vertically along the side plate and that is configured so that a safety cable can be inserted laterally through the through-slot in order to install the cable sleeve on the safety cable.

19. A fall protection system comprising the cable sleeve of claim 1 and a safety cable on which the cable sleeve is installed, the cable sleeve being configured to travel along the safety cable with the constant-contact wheel of the cable sleeve being in constant contact with the safety cable and rotating commensurately with motion of the safety cable through the cable sleeve.

20. The fall protection system of claim 19 wherein the system further comprises a harness configured to be worn by a worker, and wherein the cable sleeve is connected to the harness.

21. The fall protection system of claim 19, wherein the fall protection system is a vertical fall protection system and wherein a long axis of the safety cable is at least generally vertically aligned.

22. The fall protection system of claim 19 wherein at least a radially-outward contact surface of the constant-contact wheel is comprised of an organic polymeric material with a Shore A hardness of from 70 to 100, and wherein a coefficient of friction between the radially-outward contact surface of the constant-contact wheel, and a surface of the safety cable, is at least 0.40.

* * * * *